(12) United States Patent
Wong (10) Patent No.: US 8,738,594 B2
(45) Date of Patent: May 27, 2014

(54) METHOD AND SYSTEM OF INTERACTING WITH A SERVER, AND METHOD AND SYSTEM FOR GENERATING AND PRESENTING SEARCH RESULTS

(76) Inventor: Chin San Sathya Wong, Johore Bahru (MY)

(*) Notice: Subject to any disclaimer, the term of this patent is extended or adjusted under 35 U.S.C. 154(b) by 0 days.

(21) Appl. No.: 12/676,846

(22) PCT Filed: Feb. 6, 2008

(86) PCT No.: PCT/IB2008/001107
§ 371 (c)(1), (2), (4) Date: Nov. 23, 2010

(87) PCT Pub. No.: WO2009/030990
PCT Pub. Date: Mar. 12, 2009

(65) Prior Publication Data
US 2011/0066607 A1    Mar. 17, 2011

(30) Foreign Application Priority Data

Sep. 6, 2007    (WO) .................. PCT/IB2007/003022

(51) Int. Cl.
*G06F 17/30*    (2006.01)

(52) U.S. Cl.
USPC .......................................... 707/706; 707/751

(58) Field of Classification Search
USPC ....................................................... 707/706
See application file for complete search history.

(56) References Cited

U.S. PATENT DOCUMENTS

| 6,683,954 | B1 | 1/2004 | Searle |
| 6,871,287 | B1 | 3/2005 | Ellingson |
| 7,117,356 | B2 * | 10/2006 | LaCous .......................... 713/150 |
| 7,188,110 | B1 * | 3/2007 | Ludtke et al. .................. 707/783 |
| 8,019,648 | B2 * | 9/2011 | King et al. ............ 707/E17.008 |
| 2005/0022020 | A1 | 1/2005 | Fremberg |
| 2005/0071328 | A1 | 3/2005 | Lawrence |

(Continued)

FOREIGN PATENT DOCUMENTS

| EP | 1862916 A1 | 12/2007 |
| WO | WO 03/024140 A2 | 3/2003 |

(Continued)

OTHER PUBLICATIONS

International Search Report corresponding to PCT//IB2008/001107, 6 pages.

(Continued)

*Primary Examiner* — Isaac M Woo
*Assistant Examiner* — Tiffany Thuy Bui
(74) *Attorney, Agent, or Firm* — Foley & Lardner LLP (57) ABSTRACT

Method of generating search results for a search engine which allows users to provide feedback to the search engine. Historical data for all searches performed are kept by the search engine which is used to modify the results generated by other conventional means. When the results are displayed to the user, the user is able to interact with the system and provide feedback which modifies the historical data. Such feedback can then be used in future searches to generate results which are better ranked and clustered according to relevance to the search request. Conveniently, the user is able to provide at least part of his feedback by clicking on "up" and "down" buttons, in addition to ranked search results, the system may display other records associated with the search enquiry, such as a chatroom on that topic.

17 Claims, 6 Drawing Sheets

(56) References Cited

U.S. PATENT DOCUMENTS

| | | | |
|---|---|---|---|
| 2005/0076014 A1* | 4/2005 | Agarwal et al. | 707/3 |
| 2005/0210024 A1 | 9/2005 | Hurst-Hiller et al. | |
| 2005/0278317 A1 | 12/2005 | Gross et al. | |
| 2006/0047643 A1 | 3/2006 | Chaman | |
| 2006/0143160 A1 | 6/2006 | Vayssiere | |
| 2006/0161520 A1* | 7/2006 | Brewer et al. | 707/3 |
| 2006/0235860 A1 | 10/2006 | Brewer et al. | |
| 2007/0067268 A1* | 3/2007 | Dai et al. | 707/3 |
| 2007/0112758 A1* | 5/2007 | Livaditis | 707/5 |
| 2008/0167016 A1* | 7/2008 | Swanburg et al. | 455/414.1 |
| 2008/0209576 A1* | 8/2008 | Nooning | 726/29 |
| 2008/0235204 A1* | 9/2008 | Dai et al. | 707/5 |
| 2008/0254850 A1* | 10/2008 | Sylla | 463/16 |
| 2008/0287113 A1* | 11/2008 | Aaltonen et al. | 455/418 |
| 2009/0282254 A1* | 11/2009 | Wheller et al. | 713/172 |
| 2009/0300348 A1* | 12/2009 | Aciicmez et al. | 713/156 |

FOREIGN PATENT DOCUMENTS

| | | |
|---|---|---|
| WO | WO-2006/094097 A2 | 9/2006 |
| WO | WO-2007/059153 A2 | 5/2007 |
| WO | WO 2007/089403 A1 | 8/2007 |

OTHER PUBLICATIONS

PCT Written Opinion corresponding to PCT//IB2008/001107, 9 pages.

European Search Report dated Jun. 9, 2011 as received in corresponding European Application No. 08737588.7, 7 pages.

\* cited by examiner

METHOD AND SYSTEM OF INTERACTING WITH A SERVER, AND METHOD AND SYSTEM FOR GENERATING AND PRESENTING SEARCH RESULTS

CROSS-REFERENCE TO RELATED APPLICATIONS

This is a National Stage application of PCT/IB2008/001107, filed Feb. 6, 2008, which claims the benefit and priority of International Application No. PCT/IB2007/003022, filed Sep. 6, 2007. The foregoing applications are incorporated by reference herein in their entirety.

FIELD OF THE INVENTION

The invention relates generally to interaction between user terminal and a server. In one application, the server is one which implements a search engine, that is performs search engine result generation. The invention further relates to how the search results are generated and/or presented.

BACKGROUND OF THE INVENTION

The amount of information on the Internet is vast and cluttered. One method of searching for information on the Internet is by making use of search engines. Search engines generate indices of web pages which are used when a search is requested. The search engine will generate rankings for the indexed pages. These rankings represent which search results the search engine determines are the most "relevant" to the client's request. This is usually done using various automated computer algorithms.

One of the downsides of automated computer algorithms is that unscrupulous users are able to find ways to circumvent the algorithms by discovering and exploiting the factors which these algorithms take into consideration when computing result rankings. For example, if a web page's rank is dependant on the number of hits it obtains, a user can write programs to continuously access the links to those sites, thus pushing up the page's ranking. This results in possible clustering of irrelevant results ranking very high amongst the search results.

In this mentioned article, the encryption process may also be a form of compression technique used to allow for data transmission and/or for the purpose of storage efficiency.

SUMMARY OF THE INVENTION

The present invention aims to provide a new and useful method performed by a user terminal in communicating with a server system. The server system may be one implementing a search engine.

A first aspect of the invention proposes, in general terms, that data is encrypted (typically for communication between a user terminal and a server system, such as one functioning as a search engine) using a profile characterizing at least one aspect of the user terminal. For example, the profile (or a compressed version thereof) may be used as a key for encrypting communications from the terminal to the server and/or from the server to the terminal.

In a more specific expression of the first aspect of the invention, data pertaining to the terminal of a user is collected. Relevant data may include details such as user name, age, gender, contact details, system hardware and software configuration. The data is communicated to an encryption system of the terminal, such as a matrix based encryption system, which is capable of generating a unique identifier ("ID") representing the particular combination of the data. The matrix based encryption system may use a form of hashing algorithm to generate such IDs. IDs may be generated for individual users or groups of users and are stored on the server. Communication between the server and the terminals may then be performed more securely, either by insisting that the ID is within any message transmitted between the server and user terminal (e.g. in either direction), and/or by using the ID as a key in part of an encryption process.

This ensures that profiles are secure since anyone who wishes to access any profile without the proper rights to do so would require the exact same user information and computer hardware and software setup, or hack the encryption/decryption process.

The IDs may also be used by the server in a reverse process, by employing another algorithm to the IDs so as to obtain all the information stored for user terminal it represents. The data can then be used in various ways, as described below. Other aspects of the invention (which may be employed independently of the first aspect) propose, in general terms, that the search engine has access to a database of historical data, which has been generated by previous human users. This database is arranged by search term, so that when a search term is entered, the database is able to access the historical data, and display results to the user based on the historical data. The search engine may be implemented by a server system which communicates with a user according to the first aspect of the invention. These other aspects of the invention are particularly suitable for use with the first aspect of the invention because once the server accumulates historical data of the kind described, secure communication is very valuable.

Specifically, in a second aspect, the invention proposes that the historical data comprises data about the characteristics ("characteristic data") of Internet webpages stored on a plurality of sites, and the search engine uses the characteristic data to determine how to display links to webpages which are relevant to the search term. Thus, human interaction is capable of refining search results into highly relevant clusters of information which most computer algorithms are weak at.

For example, the search engine may rank the search results based on the characteristic data collected from human users in similar previous searches.

The search results are displayed to the client, together with additional means for providing feedback and interaction with the search results. These additional means may include buttons for providing feedback on various qualities of the result pages, so as to modify the displayed results. Possible modifications include the voting for a result to be raised in the ranking, or lowered in the ranking, labeling errant results for deletion, or labeling results containing adult content.

In another example, freely combinable with the first, search results are displayed in combination with a chat box associated with the search term. The chat box may allow interaction with other clients performing similar searches.

In any example, the ranking and display of search results may also be modified according to other characteristics of the search request. Examples of such characteristics include:
Internet Protocol (IP) address of client requesting search
The Internet Service Provider (ISP) of the client
Language of search request
Latest news events in relation to current world or regional interests.
Client subscription to groups/communities
Age group and "maturity rating" of client's account profile
Operating system and internet browser software of client Browsing history, security level settings, homepage settings and any other information obtainable from the internet browser software Local time and weather information Types of software installed in the client system Hardware profile of the client system Any combination of the above characteristics may be determined for each client, based on what information may be automatically collected from or provided by the client.

Using this information, the search results ranking and display may be further refined by providing the client with pages which are more likely to be relevant to them in terms of geographic location, language and grouping (such as age, religion, community, specialist grouping). In the embodiments of the invention, such characteristic data may be stored in the historical database and may be modified by user feedback or a change in any of the relevant client characteristics which are automatically detectable.

Geographic information may be obtained from the IP address of the client via domain name translation and matching of translated domain names to a database with such geographic information. Such databases may be found on the Internet, such as one by the Internet Assigned Numbers Authority (IANA—http://www.iana.org/domain-names.htm), or they may be created independently based on historical data collected from users.

Similarly, the ISP may also be obtained in a similar analysis the IP address of the client. This is possible since ISPs are usually assigned predetermined IP ranges, which is subsequently used by all their customers. Once a client's ISP is determined, information if interest may be included in the display of search results which may include ISP related promotions or advertisements. In some examples, the ISP's services may even be extended to be accessible from the search results display.

The language may be directly obtained from the language in which the search request was made. Alternatively, it may also be inferred from the geographic location from which the request originated. For example, a search request made in Chinese may be more likely to return search results in Chinese before any other language. Similarly, a search request in English but made from a client with an IP address located in France (as determined using methods described above) may be more likely to return French search results.

Groupings (or communities) may also be created within the system to allow users to obtain search results based on what is of interest to each group. These groups could be differentiated in terms of age, culture, religion, or any other aspect or combination thereof. Such groupings can be implicit or explicit. They may be created by users of the system, or may be implied based on the location of the clients' IP addresses. Each group may have its own independent set of historical data which stores group members' feedback on search results, search results ranking preferences of the group, and any other relevant information characterizing the group.

Each user will also be able to create an individual account in the system. These differ from the above groups in that accounts are catered towards the individual and may store personal information supplied by the users such as their name, age, gender, address, contact, hobbies, and other relevant data (which may include the list of characteristics and information listed earlier). Each user account may be part of one or more groups described above. Likewise, each account too may have its own set of historical data attached to it, which personalizes the rankings and display of search results for each user.

Browser and operating system information may also be collected from the client system. Since different browsers and operating systems may handle the display of web pages differently, in order to provide an improved display to the user (i.e. minimal display anomalies, broken image links, erroneous formatting, etc), the system will be able to determine the best way to display the results to the client. Furthermore, this information can be used to provide additional information to the client in the form of software patch notifications, updates, or promotions. Apart from the type of browser and operating system, information based on the settings of the browser may also be taken into consideration. This includes the browsing history, security level settings, homepage settings, firewall settings and information generated through the user's internet usage.

Local time of the client system may be obtained directly from time stamping cookies. Alternatively, time and weather data can also be determined from the geographical location of the client and subsequently obtaining the relevant information from other sources such as the national meteorological agencies or online sites such as http://www.weather.com. This information can be applied to search requests which are time and/or weather sensitive, such as requests involving dining location and airline travel thus providing better search results.

The system may also collect and profile client systems' software. This would allow the system to better classify the type and nature of the user. A client, whose system has a lot of graphic editing software, might be more interested in search results of a similar nature as opposed to another client, whose system may contain a majority of game software.

Hardware profiles of client systems may also be collected and the rationale is similar to all those mentioned earlier. Updates, promotions, classification of client profiles may all be possibly included with the search results with knowledge of the client hardware configuration. In addition, knowing the limitations (or lack thereof) of the system is useful in deciding what sort of search results to display. A client without a DVD-ROM drive is unlikely to be interested in seeing the results for DVD rentals. In another example, a system with additional security hardware such as biometric readers may indicate a preference for sites which offer similar security standards over those with none.

In the case where a user creates an account on the system, cookies or unique identifiers, or a combination of them, may be generated to identify the user category (i.e. based on the characteristics collected or entered by the user, a unique identifier indicative of such a category may be generated). With this information, search results are associated with the identifier to better and accurately assess the mindset/user perception of what the search results and display interface should be like to cater to the individual/group needs.

In any example, where data collection is involved, the method of collection varies. Firstly, HTTP cookies may be used to collect such data and profiling individual client systems. When a user accesses the search engine system, cookies are transparently downloaded onto the client system. Relevant data will be collected and stored on the cookie, which will then be sent back to the source.

Alternatively, the client can choose to allow the search engine system to download and run scripts on the client systems so as to collect the relevant data. Such scripts may come in the form of separate programs or add-ons or applets (such as ActiveX applets). When these programs are run, they are usually able to perform a more thorough profiling and data collection on the client system compared to cookies. In another alternative, users can provide the information manually by entering it into their user account profiles.

In any example where data collection has been performed, or is data being transmitted, encryption may be used to protect the integrity of the data within. Encryption may be performed on the data and can be decrypted via passwords or other security features such biometric security systems.

In a third aspect of the invention, when a plurality of search results is displayed to a user, each is displayed with an up-button and a down-button, by which a user can give feedback to influence the ordering of search results when the same search is performed in the future.

Also, in a fourth independent aspect of the invention, a search engine displays search results in relation to a certain search term in combination with a chat box (a term which is used here to include an irc channel or shoutbox or similar variation) for recording user comments in relation to the same search term. This chat box is displayed to interact with other users who have performed similar searches.

Characteristic data which are used to improve search results rankings in any of the aspects above include:

Search result rankings generated by a search engine are influenced by the geographical location of the requesting client. This geographical location is determined from the client's IP address.

Search result rankings generated by a search engine are influenced by language. The language may be determined from the search request or inferred from the location of the client.

A client may belong to one or more pre-defined groups of client, and the search result rankings generated by a search engine are influenced by the group(s) of the requesting client. The historical data of the group is applied to the client's search request to further refine the rankings of the search results obtained.

Search result rankings generated by a search engine are influenced by the internet service provider. The ISP may be determined from the IP address of the client in conjunction with a reference list of IP address ranges utilized by each service provider.

Search result rankings generated by a search engine are influenced by a client's user account profile and settings. This information is based on the data provided by the users when they create an, account on the system.

Search results rankings generated by the search engine are influenced by the type of internet browser software, operating system software and their respective configurations on the client's system. The relevant information is obtained via automatic data mining off the client system or via manual input by the client.

Search results rankings generated by the search engine are influenced by the local time and weather of the user. This data is obtainable either through the client's system, or indirectly via the geographical location and the relevant online databases.

Search results rankings generated by the search engine are influenced by the current events in relation to world or regional news/interests. Client's reaction/interest-response to the event information may then be used for references and to refine consumer behaviour for demographic surveying for the publishing purpose of future search ranking tabulations.

Search results rankings generated by the search engine are influenced by the computer software installed on a client's computer. Clients' systems may be profiled for such information which may then be sent to the search engine system.

Search results rankings generated by the search engine are influenced by the computer hardware installed on a client's computer. Clients' systems may be profiled for such information which may then be sent to the search engine system.

Data collection of data relevant to user profiling is performed on a client's system through the use of data collection means. The collected data may be done automatically and as a transparent process to the user, or may involve user authorization and initialization.

After a data relevant to user profiling has been collected, it may be encrypted for storage or transmission to ensure data integrity. The encryption and decryption process may make use of passwords and/or other biometric security devices.

In a fifth aspect of the invention, when a search request is made by a client, the search engine system determines whether a client system has downloaded the search engine's data mining tools, and if the determination is negative, downloads the data mining tools to the client system and uses it to collect and store data pertaining to the client. Otherwise, the data mining tools are used to update and store any data pertaining to the client. The collected client data is then transmitted to the search engine and a given set of the search results are modified and/or presented in a manner determined by the data pertaining to the client transmitted to the search engine.

In a sixth aspect of the invention, profiling of a client may be done by determining whether a client system has downloaded data mining tools, and if the determination is negative, downloading the data mining tools to the client system and using it to collect and store data pertaining to the client. If the determination is positive, the data mining tools update and store any data pertaining to the client. The collected client data is encrypted using means of encryption and stored or transmitted. The data may be accessed by decrypting the encrypted client data using means of decryption, said means of decryption making use of biometric security devices to identify and allow decryption of said encrypted client data.

In some embodiments of the invention, a cache database is implemented and accessible by the search engine for storing search results. The cache database stores a subset of the historical data and may be accessible with a much quicker response time for search results stored within compared to that of accessing the historical data. When modifications are made to the cache database, they will be effected within the historical data when the two databases are compared periodically.

In all aspects of the invention, the modifications to the historical data may be done in real time, so that the effects are immediate and can be reflected in all subsequent searches. Indeed, a given search for a certain user may automatically be performed again as soon as that user provides at least some types of input (e.g. feedback by clicking the buttons), so that he "instantaneously" sees the results of his input.

DESCRIPTION OF THE FIGURES

An embodiment of the invention will now be described, for the sake of example only, with reference to the following figures, in which.

DETAILED DESCRIPTION OF THE EMBODIMENTS

Figure 1:
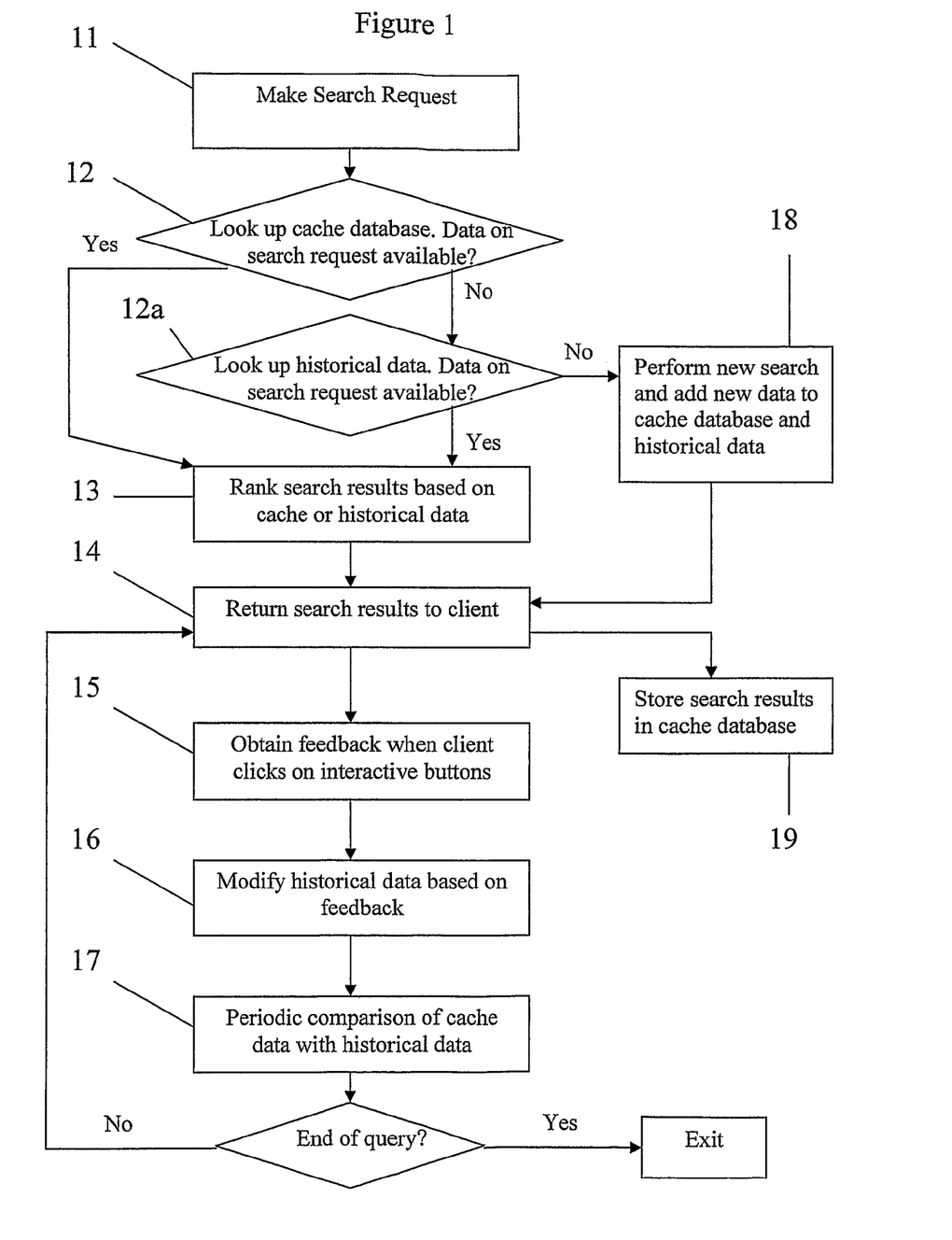
FIG. 1 shows a flow chart of the steps of a method which is an embodiment of the present invention.

An embodiment of the method of the invention will now be explained with reference to FIGS. 1 to 6. FIG. 1 is a flow-chart of steps in the method. In this method a user is communicates with a search engine over the internet. That is, the user opens using his personal computer (PC) a webpage supported by a server which implements the search engine. The search engine employs a database 51 of historical data and a cache database 71 which might be on different servers. These are explained below with reference to FIGS. 5, 6 and 7.

Figure 7:
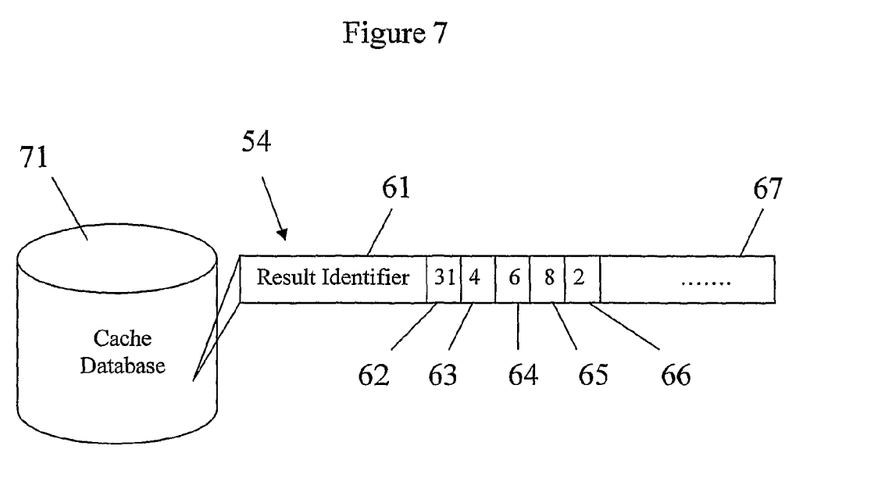
FIG. 7 shows the structure of contents of the cache database.

The cache database 71 stores a subset of the historical data as shown in FIG. 7 and usually contains data pertaining to the most recent search requests or popular requests or a combination thereof. It should be noted that the cache database 71 can be configured to store other data as well, which will be obvious to the skilled reader. In this embodiment, the cache database 71 is compiled from different types of historical database content types which are described below. The data in the cache may be further broken up into sets such that each user of the system would have their own cache data within the database. Individual users are identified on the system by the use of Internet Protocol (IP) addresses or user accounts.

The use of a cache database 71 situated on a separate server would be to enable users to obtain faster responses, since the cache server should be optimized for memory access and thus faster response time. The database for historical data, however, may be optimized for the storage of the large volume of data and processing of result data. Therefore, the cache database 71 would greatly reduce the workload of the historical data database, improving the overall service provided.

In a step 11, the client (also called a "user" here) will first make a search request which includes entering a word or phrase to be searched into the search engine. The search engine will then determine in step 12 and 12a whether the cache database 71 or the database 51 contains historical data relating to the search term. The cache database 71 is checked first in step 12 which is usually capable of faster access compared to the historical database 51. If the search request is not found in the cache database 71, a search will be done on the historical database 51 as in step 12a. If information about the search request is present in either of the cache or the historical data, in step 13 search results including historical data are extracted from the cache database 71 or database 51 in a ranking order explained below, following which the results are transmitted back to the client and displayed 14.

Figure 5:
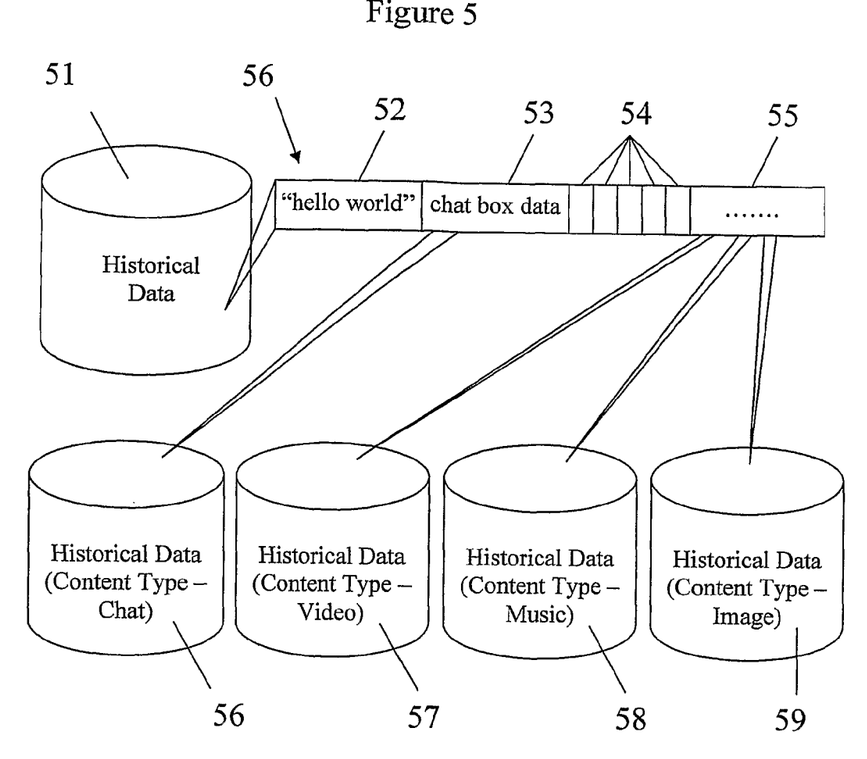
FIG. 5 shows the structure of a database of historical data used by the search engine in the embodiment of FIG. 1.

The ranking in step 13 is performed on the results generated in step 12 in accordance with a database 51 of historical data, shown in FIG. 5. FIG. 5 also shows the structure of historical data records 56 in the database 51. Although FIG. 5 shows the entire historical data to be stored on a single database 51, it is possible that the individual content types of database 51 are stored on separate databases as well. For example, historical data database 51 could store an entry 56 and within entry 56, the individual contents (i.e. chat box data 53 and other data 55 such as music and video data) could be obtained from other specialized databases 56, 57, 58, 59. This means that there could separate databases for each of all chat box type data 56, or all video type data 57, all music type data 58 and all image type data 59. The system is not limited to the databases mentioned as there are many other possibilities in which the data contents may be divided across different databases to achieve different purposes. For example, a separate "general info" database could store general purpose data for the searches which may include webpage graphics/logos/banners, the search engine start page, general text used in the webpage, etc. A separate "software download" database can also be implemented which may be better equipped to deal with large bandwidth transmissions suitable for distributing files and other common download/upload transactions to/from clients.

Each record 56 is associated with a possible search entry which is present in a field 52. Each record 56 is unique in the search word or phrase 52 it stores (note that typically there are respective records for each possible order of search terms, so that there is one record 56 for "Tom Cruise" and one for "Cruise Tom"). Together with each entry 52, the record 56 also stores: chat box data 53, a plurality of result entries 54 each associated with a respective webpage, and possibly other data 55.

Figure 6:
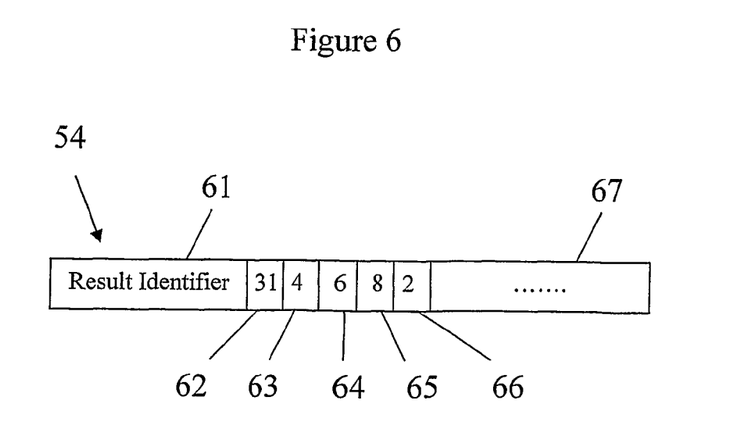
FIG. 6 shows the structure of an element of the database of FIG. 5.

The structure of each result entry 54 is shown in FIG. 6. Each result entry 54 has a unique search result identifier 61, which in this case is the Internet address of the webpage associated with the search result. Also within the result entry 54 are counters 62, 63, 64, 65, 66 which count and store the feedback from users on this particular webpage. Each counter 62, 63, 64, 65, 66 represents characteristic data, indicating a respective description of characteristics of the webpage. In this embodiment, we have five counters representing the qualities "predicted quality" 62, "deletion" 63, "adult content" 64, "rating up" 65 and "rating down" 66. The results entry 54 may also store other data 67 relating to the search result.

The counter "predicted quality" is an automatically generated quantity representing an estimate of the relevance of the webpage to the search enquiry; broadly speaking it is the parameter which determines how a conventional search engine ranks its results. By making use of the counters 65, 66, the search engine is able in step 13 to rank the search results in the list so as to define an order for those search results (note that this order may be derived at the time that the search request is made, or it can be done for each of the records 56 in advance). In this embodiment, the search engine adds the "rating up" record 65 to the quality record 62, and subtracts the "rating down" number record 66, to produce an aggregate quality estimate, and the webpages are presented in order of descending values of the aggregate quality estimate.

Similarly, the "deletion" and "adult content" counters 63, 64 can be used to modify the results so as to improve the overall quality of the search results. For example, results deemed to be irrelevant and flagged for deletion a sufficient number of times by past users could be removed from the result list (i.e. not displayed to a user at all) or placed at a low ranking in the order. Likewise, a result 54 with sufficient adult content count 64 could be displayed to the user with modified display characteristics which alert the user of its potential content. The threshold at which a particular quality is deemed to be sufficient for either of these actions to occur varies from one embodiment to another. They may for example be applied when, for a given result entry 54, the ratio of the value of a counter for a particular quality 63, 64 to the sum of the values stored in all the counters 62, 63, 64, 65, 66, is above a predetermined threshold.

Figure 2:
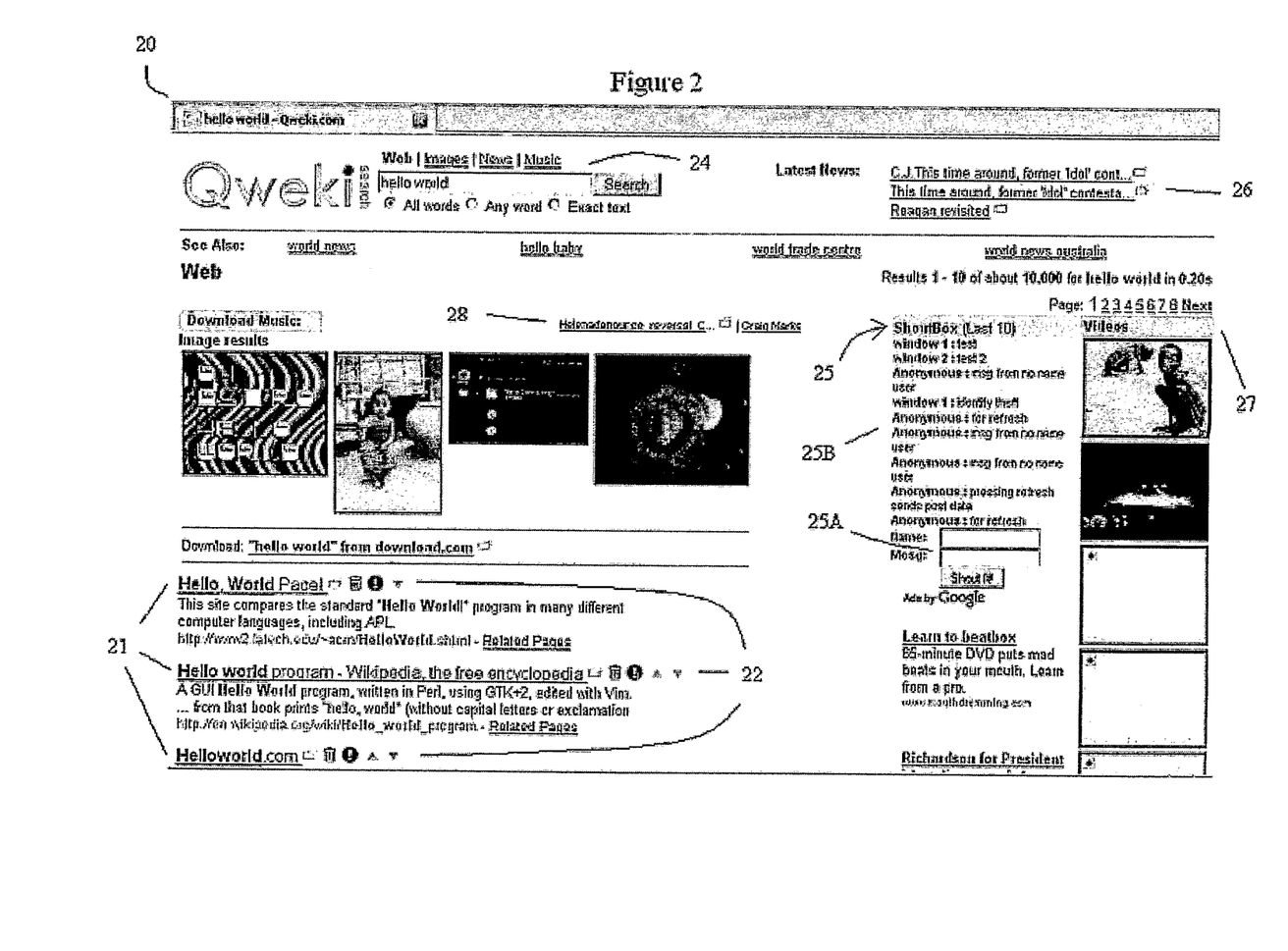
FIG. 2 shows a screenshot of the screen displayed to the user in the embodiment of FIG. 1.

In some other embodiments, similar counters may be attached to other result types, such as video results 27 or music results 28, or any other results generated. The counters would affect the results they are attached to in similar ways as described above (with the example of webpages).

Whenever a search request is made, the search terms are recorded and when searches with related terms are carried out, this is used by the search engine to sort and compile a "network" of terms which will reflect how closely (or otherwise) the terms are related. In general, the more closely related certain terms are, the more likely the search engine is able to make use of those terms to generate results with a higher relevance to the search request. A simple example of one such algorithm could be the use of term clustering via inverse document frequency (tf-idf) to generate qualitative values for inter-term relations.

The related terms may be stored on the cache database 71 or user cookies (as described below). For example, terms related to each other in general such as "aeroplane", "aircraft" and "plane" are more likely to be stored as related terms in the cache database 71 as their relationship can be applied to all searches involving those terms. Terms personalizing a user's preference would, however, be more likely stored on the client's computer. In this case example terms such as "music", "movie", "sports", etc are better used to describe the topics that each individual might want to search for and are thus stored client side.

Ranking step 13 may also utilize a variety of other characteristic data to improve search results ranking. In an embodiment of the invention, the geographical location characteristic is used to boost the rankings of relevant search results. For example, a client with an IP address of 123.145.167.189 makes a search request to the search engine. The search engine will perform domain name translation to obtain the domain name address for the IP address. For the purposes of this example, assume that this IP address translates into "www.test.edu.sg". There are several methods the search engine can use to guess the physical location of the client. It may look up known databases, such as one found at IANA, which has certain lists for domain names with country suffixes. In this example, the suffix ".sg", when matched with IANA's list, allows the search engine to guess that the client is in Singapore. Alternatively, where this is not possible (for addresses which do not have a country prefix) this information may be obtained via user feedback according to methods described earlier, and stored in the historical data 51 so that the locations of future clients with similar IP addresses (class B, C or D IP addresses) may be inferred.

By obtaining the geographical location of a client, the search results may be modified in ranking step 13 accordingly. In one example, a client makes a search request for sensitive information such as "jews". The search engine may rank the results differently for clients in Saudi Arabia and for clients in Israel and thus project different search result pages. The differences are based on the influence of user feedback from clients with similar locations. It should be noted that that the language used in the search request could also be indicative of a client's location.

Another characteristic which may be used the interne service provider (ISP) of the client. This may be obtained from the IP address of the client together with a predetermined database of IP address ranges relating to their corresponding ISPs. For example, if a client's IP is "202.165.3.4", the system is able to identify the ISP by looking up a database to see which group the IP belongs to and which ISP owns the address range. By doing so, the system may provide the user with a more comprehensive search results ranking and display. If a user were to make a search request for "cable modem troubleshooting", it would be more likely to rank the client's ISP's technical support page higher. Furthermore, it would also allow the system to inform the client's of various promotions, advertisements, and related news by the ISP.

Language is another characteristic that the search engine may use to refine search results ranking. In another embodiment of the invention, the search engine will determine the language used in the search request and check the historical data 51 associated with the language used. A search request for "Japanese War Vetarans in World War 2" when searched in Japanese (or in Japan) will most likely rank results which glorify past Japanese war veterans higher, whereas a similar search in Chinese (or China) is likely to rank results which depict the war veterans as war criminals higher. All these results are based upon user feedback and interaction with the search engine which is continuously updated and stored as historical data 51.

The system may also make use of data relating to the clients' internet browser software, operating system software and corresponding configurations. In a scenario where the client's system is running web browser software "Microsoft Internet Explorer" and the operating system "Windows XP", a client's search request for "web surfing problems" or "operating system drivers" would return results pertaining to the correct software ranked higher. Furthermore, the configurations of the internet browser and operating system are also taken into consideration, such as the security settings, firewall settings, browsing history, etc. For example, if the internet browser's security settings are detected to be at "high". Then search results which are relevant but which do not meet the security level requirements may be ranked lower compared to results which meet those requirements. Also, a page which is found to be frequently accessed in the browsing history may be indicative of the user's preferences and so pages originating from those sites may be ranked higher when found in subsequent search reqests.

Local time, weather conditions and settings of the computer and environment may also be used to improve the search results. For example, when a search at 5.00 pm local time is performed in Singapore for the request "dinner buffet", the return search results can be ranked according to the restaurants of which is nearest from the user's location.

Restaurants which serve buffets at night on the day of the search request made will also be ranked higher. Weather conditions are also incorporated into the results by supplying results suitable for the particular weather of the day of the search (i.e. open dining locations will be ranked lower on a rainy day).

Where the software profiling of the client's system is available, it may be used in the ranking process of search results. In an embodiment of the invention, a computer system is profiled to have software such as "Adobe Illustrator" and "Macromedia Flash" (graphics design and implementation software) and it is used to carry out a search request for the term "polygon". The search results generated by the system should skew heavily towards the nature of "drawing polygons" (using the associated software) as opposed to the nature of "structural information relating to polygons" which would be more relevant to other types of users (such as one with "AutoCAD" and "Mathlab" software).

In another embodiment similar to the above, the hardware setup and configuration of clients' systems are profiled and where available, used in the ranking of search results. A system with a model "ABC" graphics card is more likely to return search results with the correct software driver for the card if a search request for "graphics card driver upgrade" is made. Where security devices, such as biometric security devices or similar hardware, are detected, sites (such as online shopping websites) which support the use of such features may be ranked higher. Patches and firmware upgrades for the client's system hardware can also be displayed to the user in his search results as and when they become available.

Users may also create individual accounts on the search engine system to improve their search results. During the creation of such accounts, users will be required to provide basic information as well as optional information to the system. This commonly includes a user's name, age, address, interests, and occupation amongst other relevant items. Using the previous example of a search for "dinner buffet", if a user's account profile shows that the user is from an institution and belongs to a culinary or food tasting school or department within, the results returned for the request should then more likely be related to specialist cookbook information for "dinner buffet". In another example, users who are below certain age limits in their profiles may obtain results which have mature content filtered out.

Where data mining or profiling are required in any of the embodiments of the invention, various methods may be applied. Examples include the use of cookies, scripts and client-side manual entry or any combination thereof. These data collection means may be run by processes transparent to the user or with the user's acknowledgement. In the case of cookies, they refer to data packets used to store data relevant to the profiling of a user. Whenever a client connects to the search engine system, it may read, download or update the data within the cookie on the client's computer. Cookies are passive and are not capable of actively collecting data on the user. However, they can store any data that the user has entered while visiting the web page which provided the cookie. The type of the data stored varies and may include information on user preferences. For example data indicative of how the results are to be displayed, or information on certain personalized keyword relevance, or user information and surfing habits are some possibilities.

Alternatively, scripts, programs, add-ons or applets may be used to collect data. Such programs may take the form of ActiveX applets, toolbar add-on programs, java scripts, or just about any type of standalone software. These programs are usually capable of obtaining more information than cookies can and are able to profile users better due to having more access to the client machine, but usually require user initiative to run whereas scripts (if already enabled on the client machine) and cookies may be utilized without requiring extra effort on the user's part. When a client connects to the search engine system, the program will be downloaded to the client's system. Once the program is run, it will begin to collect all the relevant information it needs (which includes said characteristics listed earlier). This information is subsequently sent back to the search engine system and may be used to improve search results as described in the embodiments of this invention.

After a client's information has been collected, identifiers can be generated by the scripts or programs or by the search engine system itself, to identify the unique set of data belonging to the client. If the users have an account on the search engine system, these data and identifiers will be associated with the respective accounts. Such data is constantly being updated and stored in a manner similar to that of historical data 51. Unique identifiers are assigned to each combination of characteristics found in user profiles. Similarly, they may also be applied to groups (which are described below). In any of the embodiments where client data is involved, encryption may be carried out to protect the integrity of the data. After data has been collected, the data may be encrypted for storage or transmission to the search engine system. Security means, such as passwords or biometric security devices may be incorporated into the encryption process. This ensures that only authorized parties are allowed to decrypt and read the data. For example, when a user's data is transmitted, it might also require the user's authorization in the form of a password or biometric security (which may come in the form of fingerprint scanners, retina scanners, etc). Upon receiving the necessary authorization, the data is transmitted to the search engine system. The system may have, on its own end, similar security measures, which only allows the system to use the information, and not unauthorized parties to retrieve it.

In yet another embodiment of the invention, grouping of users are done to form groups (or communities). This allows groups of users to have special search preferences unique to their individual groups, providing them with more relevant search results. Such grouping may be implicit or explicit. Implicit grouping can be done via identification of certain characteristics. In earlier examples, using geographical location and language characteristics to differentiate different clients may be seen as a form of implicit grouping. Domain names which contain additional identifiers such as ".edu", ".gov", etc can also be used to group clients implicitly into "education" and "government" groups. Explicit grouping refers to active subscription on a client's part to certain groups. This includes user created groups such as "National University of Singapore" or "Ballroom Dancing" groups.

The groups and independent historical data 51 associated with each group are stored on the search engine database. The advantage with such grouping is that it provides flexibility to accommodate users with common interests and caters to as few as an individual client all the way to millions of clients within a group. Since historical data 51 is separately kept and monitored for each group, they are constantly refining the group's preferences on search results ranking and allows each group a unique development of search preferences.

It should be noted that these methods of ranking search results may be applied to other characteristics of a client, which include users' age groups and religious groups. Groups may also intersect and overlap with one another in any combination. For example, a user subscribed to the group "National University of Singapore" group may also be within the "Education" and "University" group. Therefore, a search on "giraffe" would likely return results which rank scientific papers or other advanced topics on giraffes higher. Accordingly, a user who is in the "Education" group and also subscribes to the "Kindergarten" group is likely to get results pertaining to drawings of giraffes and simpler information ranked higher.

In all the embodiments describing the use of characteristic data so far, they may be implemented by the search engine and stored as historical data 51 using a similar system of counters described earlier.

Ranking based on the characteristics described above may also be applied to search results in any combination. This makes it possible for combinations of various historical data 51 to be used to refine search results for very specific users.

A user might search for "Tom Cruise" and prefer to view results on his latest movies—in this case the user's cookie might store information which would regard the keyword "movie" as more relevant for this user and rank the results accordingly. Contrary to that, another user might prefer to view clothing and fashion relating to Tom Cruise and thus a similar search for "Tom Cruise" by this other user could use this information to produce results of relevance to "clothing" and "fashion" instead.

Figure 8:
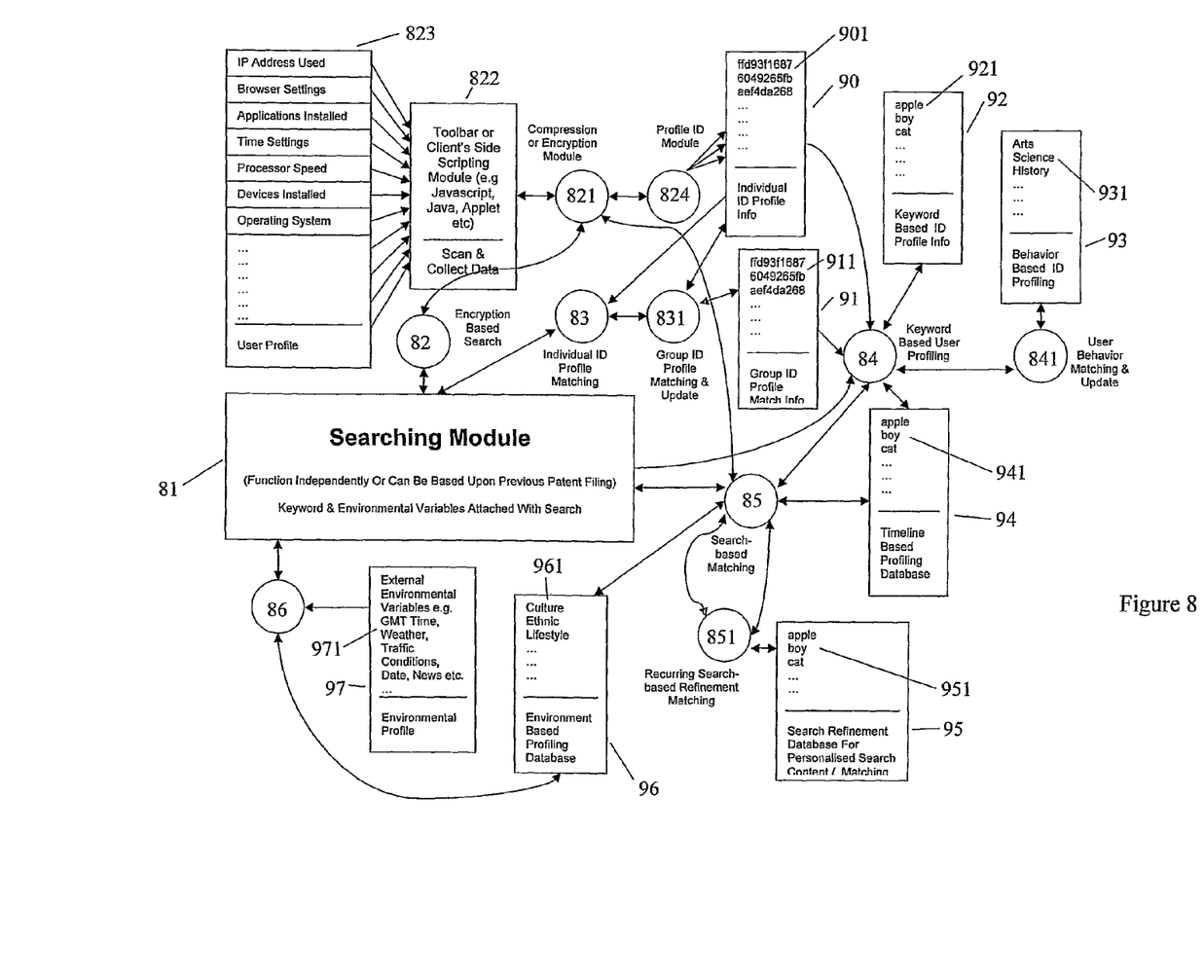
FIG. 8 shows schematically the interaction between software moduless and databases used in the search result generation and ranking process by the embodiment of FIG. 1.

FIG. 8 gives an overview picture of an example of the search ranking process 13, showing the operations performed. The sub-steps of process 13 are performed by software "modules". The components which are performed by the user terminal are shown as the units 823, 822 at the top left of the figure. The modules 82, 83 and 821 are the interface between the user terminal and the server, including certain operations performed at the terminal and others performed at the server and yet others where the interaction of both the terminal and the server are required. The interface includes an encryption based search component 82, an individual ID profile matching component 83. Note that these modules would be operative to generate a secure communication path to the server system even if the server system were not a search engine system, as in the present embodiment.

The compression and/or encryption module 821 is operative to establish a secure communication path between the user terminal and the server system. As a first step it collects the necessary client data using the data mining tools 822. Data mining tools 822 scan clients' systems for characteristic data 823 and collect it. This data is communicated to the compression and/or encryption module 821 from data mining tools 822. This produces a unique user ID, which can be used for communications between the terminal and the server. Specifically, all communications from the terminal to the server include this ID. Such communications are typically encrypted so that the user ID can never become available to third parties who evesdrop on the communications. When the server system receives from the terminal communications including the ID, a unit 824 of the server identifies the corresponding user profile. The compression or encryption module 821 (which is generally implemented both by software running on the terminal and on the server) is also responsible for secure communications from the server to the user terminal.

In the server system which is part of this embodiment, the server includes a searching module 81 which co-ordinates the searching operation by accessing modules including a keyword based user profiling component 84, a search based matching component 85 and component 86.

When the search engine performs a function which involves encryption, such as the data mining operations mentioned above, the request is sent to encryption based search component 82. This is then communicated to the compression and/or encryption module 821. After compression and/or encryption of the data collected it may be sent back to the encryption based search component 82 for further processing and/or sent to a profile ID module 824 for storage into the database 90 for individual client profiles. As described earlier, each profile has its own unique identifier 901 generated for it when the data is collected. This unique identifier 901 is used as the key for database 90.

The individual ID profile matching component 83 allows search module 81 to access and retrieve client IDs for purposes such as user authentication and search results ranking. It obtains the requested profile from the database 90 and returns it to the searching module 81. Alternatively, if searching module 81 also requires grouping information of the user, the individual ID profile matching component 83 will communicate with the group ID profile matching and update component 831. Group ID profile matching and update component 831 will then obtain both the individual ID profile from database 90 as well as the group ID profile from database 91 which stores all the group profiles for the system. Similar to database 90 for individual profiles, the group profiles are each assigned a unique group ID 911 which is used as the key in database 91. Once the relevant information is retrieved from the databases 90, 91, they are sent back to the searching module 81 for further processing. It should be noted that the group ID profile matching and updating module 831 is able to update the contents of databases 90, 91 with respect to group profile information and information on groups subscribed to by individual profiles.

We now turn to a more in-depth discussion of the operation of the units 82, 83 and 821. The encryption based search component 82, compression and/or encryption module 821 and individual ID profile matching component 83 may be integrated as a single matrix based encryption component. In this embodiment of the invention, the matrix based encryption component is arranged to receive data relevant to clients' computers. Means for obtaining such data is described later in detail with regards to data mining. Based on the unique combination of the data collected from clients' computers, a unique ID is generated by the matrix based encryption component. It may obtain information on the client's central processing unit (CPU) model, graphics card model, hard disk model, software installed/configuration, user info and any other relevant information. A method may be applied to encrypt such information into a unique identifier, such as MD5 hashing, or any other technique which would achieve a similar result. Since, the hardware and software configuration, coupled with user data, is extremely likely to be unique, this also serves as a very effective security measure as such an ID would be very hard to replicate on another system not belonging to the client. As described earlier, this ID may then be sent to profile ID module 824 and stored into database 90.

The preferred encryption technique employed here is referred to as Matrix-based encryption (MBE). MBE is an encryption method using data characterizing a hardware configuration ("first data" or "first data structure") to encrypt "second data" (or "second data structure"). The second data and data structures are preferably divided into a plural number ("n") of portions with or without prioritization and with or without preference of which portions are to be divided. They are then encrypted to form multiple portions of encrypted information. In order to reverse-engineer the encrypted information and/or encryption method(s), one has to have a similar system built to decrypt it. In general terms, MBE is an encryption method which relies on the specific combination of a system's configuration, settings, and other characteristics (which may include user entered information such as user name or passwords) to perform the encryption and decryption process. Therefore, only a system with the exact same configuration, settings and characteristics may decrypt data encrypted by MBE. MBE encryption method is dependent on the hardware configuration, which means it can be used on both client and server computers and may be built into the system itself. MBE is a standalone encryption method which works on the server side in some of the embodiments of the present invention. If it is working on the client's side, it can be used for ID generation purposes. The encrypted results may be based on, with or without priority given, in any combination of the following:

i) a password
ii) a username with password
ii) CPU Speed (processor power)
iii) Memory Sizes and/or swap/virtual space and/or memory addressing references
iv) number of encryption methods used (or recurring encryptions performed)
v) network connection speed, MAC address, human biometrics, password input or any other inputs.

Matrix-based encryption identifies the surrounding environment and takes such factors into consideration to compute the best possible performance for the encryption method used.

The encryption process (and results) may also be affected by factors such as:

1. compilation of the matrix-based software and/or coding during installation to modify its features towards application of encryption process.

2. settings which may be adjusted to any requirements needed such as higher encryption strength, number of variables to be used, factors affecting results of encryption generated for it.

In addition, the matrix based encryption may rely on other programming encryption methods regardless of the encryption method used. The resulting output is a combination of randomly generated encryption based upon matrix-style encryption and may be used for "two-way" encryption (enough encrypted data is transmitted to fully construct the second data; this is also called "barebone" encryption here). However, types of MBE are also described below which are "one-way" encryption (i.e. not enough encrypted data is transmitted to fully construct the second data, although enough encrypted data may be transmitted to achieve another purpose, such as identifying a terminal or user).

Suppose that the input data ("second data") is a password. n encrypted passwords are generated (each using a different random selection of the parameters in points (i) to (v) above) and sent by the system which performed the encryption (e.g. the host or the terminal) to another system (e.g. the terminal or the host). In this case, the n encrypted password(s) can be derived from the corresponding "seed" values (the "first data") which are the environmental variables that software running on the terminal has detected and extracted. Those values can make up the additional n passwords needed for higher security encryption purposes. The original password may also be divided into n portions and each portion used is needed to reconstruct the password. It should be noted that in some embodiments of MBE, there may be no difference between the "first data" and "second data" referenced in the examples above. All the inputs into MBE (whether they may behardware characteristics, passwords, parameters, user inputs or raw data, etc) may be used in separate parts or as a whole (then broken up) as the n passwords. They may be used as keys or "seed values" in the encryption process, or may otherwise also be the encrypted data themselves.

Note that the password(s) referred to in this section may be derived from a user's keyword, password or system variable to make up his seed password. Depending on his system and the level of security setting, if a client application is installed (toolbar or script with MBE), the client may opt to use MBE to enhance their profiling automatically or manually. As MBE's performance (on a client's terminal) are dependent on user's system, it can adjust itself accordingly as described later.

Although it does generate additional transmission overhead within the system, if the transmission of the encrypted results are within the system environment, this can be quickly matched with an authentication system's database using either match-sorting method or direct memory address referencing. Some examples of matrix based encryption (and decryption) and its variants are given below. Note that the examples describe certain features of MBE and the exact system may be a combination of one or more of such encryptions.

We now give some specific, but schematic, explanations of types of MBE.

1. Barebone Matrix-Based Encryption (MBE)

These processes are explained using the following two examples, shown by diagrams. Each diagram shows overall the encryption process, followed by the decryption process. In each, the left of the diagram shows input data, the right of the diagram shows the output data, and portions in between are made up alternately of operation steps, followed by the result of that operation.

Example 1

Password→MBE→encrypted password→reverse-MBE→Password

Thus, input data (a password) is operated on by MBE to form an encrypted passwords. This may be transmitted to a second location, where the MBE operation is reversed to reconstruct the password. For example, a password (e.g. "Person") may go through the MBE process to result in an encrypted password (e.g. "nosreP"). The process to "reverse" MBE may also be applied to the encrypted "nosreP" to obtain the original password "Person" again.

In a further possibility, there may be multiple layers of encryption/decrption. For example:

Person→MBE process 1→nosreP→MBE process 2→rePnos

In the above example "rePnos" is randomized encrypted password. MBE is capable of generating multiple values and layers of encrypted information and of which those generated values can be used to enforce better encrypted information so as to obtain further and different levels of protection. In this case, the encypted data (rePnos) will make no sense unless it is "brute forced cracked". The MBE may include a inbuilt brute force hacking mechanism (or hash value memory address matching) and the strength of its decryption capabilities is dependent on the hardware used to perform the initial encryption. What this means is that the capability (processing power, memory, of the computer amongst other factors) will determine the strength of the encryption and therefore, the decryption process will also have a difficulty corresponding to such capability.

Enhanced MBE

In enhanced MBE the password is not only encrypted, but broken up into a plurality of encrypted portions, which, when supplied to a reverse MBE process, allows the retrieval of the original password.

Password→MBE→encrypted password 1, encrypted password 2 . . . encrypted password n Enhanced MBE is a development of barebone MBE. The difference the two lies in that Enhanced MBE is includes splitting the password into different portions. Like a jigsaw puzzle, wherein a picture is divided into many portions, in order to obtain the original password, reverse MBE will match areas surrounding the jigsaw pieces until it obtains an arrangement which makes sense. Alternatively, it may complete one of the jigsaw pieces as a key to unlock the full picture.

Taking the example of a 2×2=4 portion password (four jigsaw pieces). The possible number of combinations of the four pieces would be 4×4=16 different combinations. However, only one arrangement of the 4 pieces will make sense (the original password) and so Enhanced MBE will be able to, in a reverse process, brute force match this for one value to make sense of the final value when given multiple pieces of the encrypted values.

In this case, the system will attempt to match the pieces of encrypted password to the "seed" values of the environmental settings which were used in the encryption process. The "jigsaw" (password) will only "make sense" if they match the seed values.

In a more complex example, a password may be split into 100×100=10000 portions of encrypted passwords. In some cases, higher computing platforms of today should have no problems splitting a simple text line into multiple binary values which can then be translated into hex values, or something similar, depending on computational speed, thus generating an incredible amount of values for encryption purposes. For decryption, a few seed values could be generated back to the system for matching up with the system. If the matching is positive, it will likely be able to proceed to match the remaining values and complete the decryption process.

One Way MBE

This is represented by the following diagram:

Password→MBE→encrypted password 1
  encrypted password 2
  .
  .
  .
  encrypted password n→Randomly selected encrypted password x, a random selected password from password 1 to password n.

That is, n encrypted passwords are generated, but only one is then used (transmitted) to a different location. One way MBE is a simple variant of MBE in that the reverse process (from encrypted password→password) is not performed. One way MBE may be used in systems where only authentication is required and thus there is no requirement for obtaining the original passwords (information) from the encrypted passwords.

N—Way MBE

N-way MBE is a variant which provides for a variable extent of "reversal" of the decryption process. One-way MBE, as described earlier, meant that one cannot decrypt the password to get the actual value; two-way meant that it could be decrypted.

N-way means that the system may decrypt the password individually to have the individual "passwords" instead of them being used as one entity (multiple passwords stringed together (concatenated) to form one password).

Example ('L','o','v','e') 2×2 matrix=('L','o','v','e') 4 part breakdown.
Love→MBE process 1→evoL→MBE process 2→ovLe
4 generated "seed passwords" may be obtained individually:
ovLe→reverse-N-Way-MBE→o
OR,
ovLe→reverse-N-Way-MBE→L
OR,
ovLe→reverse-N-Way-MBE→v
OR,
ovLe→reverse-N-Way-MBE→e
Or alternatively, the entire original string may be reconstructed.
ovLe→reverse-N-Way-MBE→Love (original password obtained as a whole)

Another Example ('Santa','is','coming','town') 2×2 matrix=('Santa','town','coming','is') 4 part breakdown.
Santa, is, coming, town→MBE process 1→town, coming, is, Santa→MBE process 2→gnimoc, nwot, atnaS, si
4 generated "seed passwords" may be obtained individually:
gnimoc→reverse-N-Way-MBE→coming
OR,
nwot→reverse-N-Way-MBE→town
OR,
atnaS→reverse-N-Way-MBE→Santa
OR,
si→reverse-N-Way-MBE→is
Or alternatively, the entire input string may be reconstructed:
gnimoc, nwot, atnaS, si→reverse-N-Way-MBE→Santa, is, coming, town This is a very useful feature which allows the individual components of the original password (information) to be extracted without having to go through the entire decryption process for the entire password. The choice of usage between obtaining individual components or the entire passwords, will be dependent upon the purposes for which N-way MBE is used.

MBE, in the various formed described above, seeks to improve upon two shortcomings of decryption methods presently used: speed of processing power and brute force decryption. Given the increasing processing power of computing platforms, to brute force attack an encrypted data to generate a password will be increasingly easier or faster. Matrix-based encryption method is able to prevent this to a greater degree by randomly selecting a few variables to increase the complexity of the algorithm in order to make encryption more meaningful in accordance to the processing power of the latest technologies and making decryption more difficult for hackers or crackers as similar systems will need to be built in order to decrypt those information.

In an embodiment of the invention, the unique ID generated and encrypted based on the user information and user's system information may be obtained via an algorithm which is reversible. This means that it would be possible to obtain the user's information and system information via applying a decryption algorithm to the unique ID generated. For illustrative purposes, a user with the name "Tom", birthday of "Jan. 1, 1975", living in "United States of America", having a computer system equipped with a "Intel 2.2 GHz" CPU chip, "nVidia Geforce 8800GT" graphics card, "80 gb Western Digital" hard disk drive and have software such as "Microsoft Windows Vista", "Firefox web browser" and "Adobe Photoshop" installed. Upon collection of this information, the matrix based encryption module will generate the unique ID for such a configuration, which may look like "ffd93f1687". This ID is stored in database 90 and is used to identify not only the user, but will contain all the information of the user. In the simplest case, the ID could be a simple concatenation of hashed codes for each piece of information, wherein "ff" might correspond to "Tom", "d9" to correspond with "Intel 2.2 Ghz" and so on. In order to retrieve all the information, a decryption algorithm could be applied to the ID. There is an increased level of security in this since "identity thefts" wherein if another user tries to falsify their identity as the rightful user, they would not only require access to the rightful user's account, but also have the exact same system as defined by the information collected on the user's system.

In the event where a rightful user has made changes to his system hardware or software configuration or user info, a new unique ID will be generated for this new configuration. In order to match the information with the old ID and update database 90 accordingly, the update process will include: using the previous ID to identify the entry which needs to be updated and, updating the old ID with the new unique ID generated.

Although the above processes have been described with respect to individual profile IDs, the same would apply to the group profile IDs and is similarly handled by the matrix based encryption module.

In the embodiment shown in FIG. 8, when a client makes a search request, the searching module 81 will use the search based matching component 85 to process the request. The keywords of the request are sent from the searching module 81 or the search based matching component 85 to the keyword based user profiling component 84. Keyword based user profiling component 84 will then retrieve the necessary data from the databases 90, 91, 92, 93, 94 pertaining to the keywords and the search request. Information regarding the client and the groups the client subscribes to are first retrieved to identify the nature of the client making the request. Based on this information, and the request itself, the most relevant entries within the keyword database 92, behavior database 93 and timeline database 94 are selected. In an example a student profile belonging to an animal species preservation activist group makes a search for "dodo extinction". In the keyword and timeline databases 92, 94, the entries 921, 941 relating to the terms "dodo" and "extinction" will be retrieved. In addition, the user behavior matching and update component 841 will be used to access the behavior database 93 for the most relevant "behavior" 931 of the client. In this example, the relevant behaviors 931 of the client may be that of "animal life" and "history". The behaviors 931 are then communicated back to keyword based user profiling component 84. Keyword based user profiling component 84 then transmits the combined information back to the search based matching component 85. In this embodiment of the invention, the component 84 is capable of updating databases 92, 94 with new or modified keywords, and component 841 is able to update the database 93 with new or modified behaviors.

In a similar manner described above, search based matching component 85 may access and/or update environment based profiling database 96 to further classify the results. Using the same example of our student above, the environment 961 selected may be "research" and thus data pertaining to such an environment 961 is returned to the search based matching component 85. A recurring search based refinement matching component 851 is used to check the search refinement database 95 for similar searches 951 which may have been done before. If there were previous searches of similar keywords, the search 951 is returned to component 851 and subsequently search based matching component 85.

With the information retrieved, the search based component 85 will compare and match the results and those that appear the most in the selected categories 901, 911, 921, 931, 941, 951, 961 are deemed to be the most relevant. The results are then returned to searching module 81. Finally, component 86 will access database 96 for the environmental profile 961 of the client making the request and obtain the corresponding environment characteristics 971 from the environment database 97 and return then to searching module 81. Searching module 81 will then select and rank the search results based on all the data available.

In some embodiments of the present invention, additional modules may be used to perform recurring processes so as to improve the quality of the process it repeats. This may be applied to the encryption process, the user behavior matching and update process and the search based matching process.

In the recurring encryption process, a recurring encryption refinement module may be included in communication with the encryption based search component 82 or matrix based encryption module as described earlier. It performs the task of repeating the processes performed by the encryption based search component 82 or the matrix based encryption module. By doing so, additional information may be continuously added, and/or updated, to the profiles and encrypted accordingly, thus ensuring better quality of the profile IDs stored within databases 90 and 91.

A recurring user behavior matching and update module may be implemented in communication with the user behavior matching and update component 841 as well. This module will repeatedly monitor and process user behaviors. If a user were to search for "apple" and "pie" and "recipe" and "cookbook", this pattern of searches or such "behavior" will be recorded and updated within database 93. Such "behavior" may be recorded via some form of hashing or pattern recording method such that another user with similar searches would match such a behavior. In the event that such "behavior" matches, users may be presented with results which earlier users with similar behavior(s) have shown interest in.

In some embodiments of the invention, such behaviors may be profiled for each individual and group ID. With such a function enabled, users may have the option of accessing certain parts of other individuals' or groups' profiles when they have a behavior match with said individuals and/or groups, which is likely to provide much more relevant results from those stored within the matching profiles.

It should be noted that the recurring search based refinement matching component 851 as described earlier functions differently from the recurring user behavior matching and update component in that, the search based refinement matching component 851 refines the results for the individual keyword which have been searched, as opposed to the latter, which tracks user behavior via their actions (type of searches made, types of results interested in).

While this embodiment has described the communication access and order of the components in a particular way, it should be clear to the skilled reader that the order of retrieval and application to the search process may be carried out differently to similar effect.

Once the ranked results are generated, they are returned to the client and presented to them in step 14 in the form of a webpage such as one shown in FIG. 2. Together with step 14, the search results are also stored in the cache database 71 in a separate step 19.

The results page 20 displayed to the user by the embodiment is shown on FIG. 2. The search results 21 are listed in an order based on the ranking in step 13. The search box 24 reflects what search word or phrase was used for the search. Interactive buttons 22 accompany the display of each of results 21 and they allow the user to provide feedback to the search engine in real time with regard to the particular result. Although interactive buttons 22 accompany only results 21 in FIG. 2, they can be applied to the video results 27 or the music results 28 or any type of results generated as well to achieve similar functions.

Figure 3:
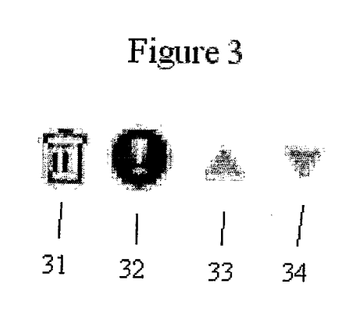
FIG. 3 is a detail of FIG. 2 and shows buttons used in the embodiment of FIG. 1.
Figure 4:
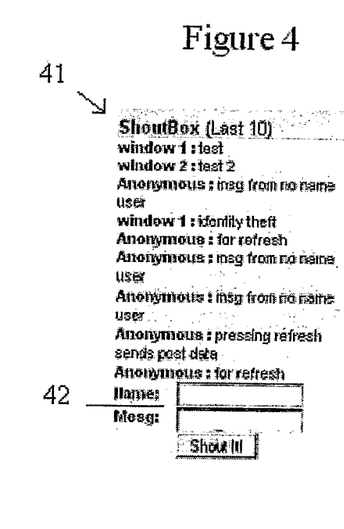
FIG. 4 shows a chat box used in the embodiment of FIG. 1.

Referring to FIG. 3, a set of interactive buttons used in this embodiment is shown. The four buttons 31-34 allow the user to provide different types of feedback. Clicking on button 31 votes for the result to be deleted. Button 32 votes for the result to be labeled as adult content. Button 33 votes for the result to be given a higher rating, and button 34 votes the result to be given a lower rating.

When a client clicks on any of buttons 31-34, the feedback is transmitted back to the search engine (step 15). For example, if the client clicks on the rating up button 33, the search engine would then look up the search entry 56 from within the cache database 71. From there, it would find the corresponding result entry 54. The appropriate counter 65 denoting the feedback for "rating up" would then be increased by one.

Using this feedback, the cache database 71 maintained by the search engine is modified (step 16). In order to update the database 51 containing the historical data, periodic comparison checks are performed between the cache and the historical data in step 17. Where there have been updated modifications made in the cache, the historical data will be modified to incorporate those changes as well. Thus, search requests for the same search term in the future will be ranked based on historical data 51 with the new feedback included.

Indeed, optionally, as soon as a user enters feedback, the search results may be regenerated to include the feedback (for example, if the user has clicked the up-button in relation to a particular webpage, the search results may be displayed again with this webpage in a higher position). Thus, real-time incorporation of human interaction is possible.

As further shown in FIG. 2, other elements obtained using historical data could be included in the results page 20. Chat box 25 allows the client to interact with other clients who have made similar search requests. When the client makes a search request, chat box data 53 is also retrieved from the database 51 of historical data. This chat box 25 is then included in the results page 20 displayed to the client. The chat box 25 comprises a chat contents area 25B, which contains messages posted into the chat box by clients, and data entry means 25A for entering messages into the chat box 25.

When a client enters his message into chat box 25, it is sent to the search engine which will update historical data 51 in a manner similar to updating user feedback from interactive buttons 22 described above. The appropriate search entry 56 is found, and the contents chat box data 53 is updated with the new entry.

Other features may also be included within the results page 20. These include, but are not limited to, special results relating to the latest news 26, video results 27 relating to the search request and music results 28 relating to the search request. In all these examples, the data for such results may be stored and updated in the historical data in a method similar to the examples discussed earlier, as will be clear to the skilled reader. The locations 55, 63 within the database 51 of historical data used to store other data 55, 63 may be used for such features.

By introducing the element of human interaction on feedback, users are able to determine the relevance of results and notify the search engine accordingly. Since such interaction is not easily automated, it makes it harder for malicious users to circumvent the system. In the event that they manage to do so, other users will be able to police their actions by giving feedback to the contrary.

If the search request made is not found in either the cache database 71 or the database 51, a new result entry 56 is created for the search request in step 18. A new search is performed for the request and the results are added to the cache database 71 or database 51 of historical data or a combination or both, depending on the requirements of different embodiments.

In the case that, in step 12, it is determined that a search request was made which does not correspond to any of the existing records 56, a new result entry 56 is created for the search request in step 18. A new search is performed for the request and the results are added to the cache database 71 or database 51 of historical data or a combination or both, depending on the requirements of different embodiments. In this case, a conventional search engine may be used to perform a search for webpages relevant to that search term, and to obtain a quality index for each page found indicating the relevance of that page. A record 54 is then set up for each webpage for which the quality index is above a predetermined value. The counter 62 is set to the determined quality value, and all the other counters are set to zero.

Furthermore, since a webpage may change over time, historical data about that webpage gradually becomes out of date. In order to cope with this, the values stored in the counters 62, 63, 64, 65, 66 may be decreased over time (for example, multiplied periodically by a constant factor less than one, such as 0.99 each day), so that older modifications to the counters become gradually less important in determining the present values. The way in which this is done may be different for different counters.

Furthermore, the embodiment preferably contains a mechanism for adding new webpages to the database 51. This may be done by the server which implements the search engine having a unit for updating the database 51. This unit tries to find new webpages relevant to the search term 52 of each of the existing entries 56. When it does, it assigns a quality value to each new result found indicating the relevance of that result, and if that quality value is more than a certain threshold, it sets up a new record (of the type shown as 54 in FIG. 5), having the quality value as counter 62, and the values of the other counters 63, 64, 65 and 66 as zero. Optionally, before this new record is added to the set of records 54 in the historical data 51, there may be a phase in which, when the corresponding search enquiry is entered into the search engine, the new record is displayed on the webpage of FIG. 2 together with voting buttons, and the new record is only entered into as a record 54 if a feedback criterion is met, e.g. if it receives a sufficient amount of positive feedback during a predefined time.

Although the invention has been described in the above using particular embodiments, many variations are possible within the scope of the claims, as will be clear to the skilled reader.

For example, to prevent a certain user from boosting his site by continually pressing the up-button in relation to it, the database 51 may contain identity information (e.g. internet address) recording whose input altered the historical data, e.g. the values of the counters 62, 63, 64, 65, 66, and feedback having the same identity data can be discounted in future updates of the historical data.

The invention claimed is:

1. A method for generating search results in a search engine, the method comprising:
   (a) registering a search request which includes at least one search term made by a user,
   (b) determining whether a database contains characteristic data previously entered by human users and indicating characteristics of a plurality of internet webpages having relevance to the search request, and
   (c) if the determination is positive, extracting the characteristic data from the database and presenting search results for the webpages in a manner based on the characteristic data;
   wherein communications between the search engine and a system making the search request are encrypted using an ID comprising information about, at least one of: i) computer software installed on the system and ii) computer hardware installed on the system;
   wherein the search results are presented in combination with other data relevant to the search term and previously entered by human users;
   wherein the other data comprises a chatroom related to the search term;
   wherein at least part of the characteristic data indicates the relevance of the data to the search request, and in step (c) the search results are presented in an order determined by the characteristic data;
   wherein the search results are presented together with a respective set of one or more buttons clickable by the user to modify the characteristic data.

2. The method according to claim 1 in which the buttons include at least a button which lowers the rank of the corresponding search result within the order, and a button which raises the rank of the corresponding search result within the order.

3. The method according to claim 1 in which the search request comprises search characteristic data, wherein the search characteristic data identifies a geographical location of the client.

4. The method according to claim 1 in which the search request comprises search characteristic data, wherein the search characteristic data identifies a language in which the user made the search request.

5. The method according to claim 1 in which the search request comprises search characteristic data, wherein the search characteristic data identifies an internet service provider of a user making the search request.

6. The method according to claim 1 in which the search request comprises search characteristic data, wherein the search characteristic data identifies an internet browser software or operating system software and corresponding software settings of a system making the search request.

7. The method according to claim 1 in which the search request comprises search characteristic data, wherein the search characteristic data identifies a local time and weather of a location of a user making the search request.

8. The method according to claim 1 in which the search request comprises search characteristic data, wherein the search characteristic data identifies user profile information extracted from a user account of the user.

9. The method according to claim 1 in which the search request comprises search characteristic data, wherein the search characteristic data identifies historical data extracted from one or more groups of which the user is part.

10. The method according to claim 1 in which said characteristic data is obtained by a method comprising:
(a) determining whether a client system has downloaded data mining tools from the search engine,
(b) if the determination is negative, automatically downloading the data mining tools to the client system and storing any data collected on the client in the data mining tools, or
(c) if the determination is positive, automatically updating any data collected on the data mining tools, and
(d) transmitting said data in the data mining tools to the search engine; wherein, said data in the data mining tools is stored and used as said characteristic data to improve search results.

11. The method according to claim 10 in which the data transmitted from the data mining tools to the search engine is further encrypted using biometric security.

12. The method according to claim 1, wherein the ID is included within a message between the search engine and the system.

13. The method according to claim 1, wherein the search engine is arranged to receive input from a user which modifies the characteristic data relating to a given search result, the user input being a member of the group consisting of: (i) a recommendation not to display the search result in response to future searches, and (ii) a recommendation to label the search result as relating to a website containing adult content.

14. The method according to claim 1, wherein the search request comprises search characteristic data, the search characteristic data identifying, at least one of: computer software installed on a system making the search request or computer hardware installed on the system.

15. A method for generating search results in a search engine, the method comprising:
(a) registering a search request made by a user,
(b) determining whether a database contains characteristic data previously entered by human users and indicating the characteristics of a plurality of internet webpages having relevance to the search request, and
(c) if the determination is positive, extracting the characteristic data from the database and presenting search results for the webpages in a manner based on the characteristic data;
wherein communications between the search engine and a system making the search request are encrypted using an ID comprising information about, at least one of: i) computer software installed on the system and ii) computer hardware installed on the system;
wherein said characteristic data is obtained by a method comprising;
(a) determining whether a client system has downloaded data mining tools from the search engine,
(b) if the determination is negative, automatically downloading the data mining tools to the client system and storing any data collected on the client in the data mining tools, or
(c) if the determination is positive, automatically updating any data collected on the data mining tools, and
(d) transmitting said data in the data mining tools to the search engine; wherein, said data in the data mining tools is stored and used as said characteristic data to improve search results;
wherein the data transmitted from the data mining tools to the search engine is further encrypted using biometric security.

16. The method according to claim 15, wherein the ID is included within a message between the search engine and the system.

17. The method according to claim 15 in which the search request comprises search characteristic data, wherein the search characteristic data identifies, at least one of:
i) a geographical location of the client,
ii) a language in which the user made the search request,
iii) an internet service provider of a user making the search request,
iv) an internet browser software or operating system software and corresponding software settings of a system making the search request,
v) a local time and weather of a location of a user making the search request,
vi) user profile information extracted from a user account of the user,
vii) historical data extracted from one or more groups of which the user is part,
viii) computer software installed on a system making the search request, and
ix) computer hardware installed on the system.

* * * * *